United States Patent
Wang et al.

(10) Patent No.: US 11,503,400 B2
(45) Date of Patent: Nov. 15, 2022

(54) WIRELESS HEADPHONE ASSEMBLY

(71) Applicant: Xuetao Wang, Shenzhen (CN)

(72) Inventors: Xuetao Wang, Shenzhen (CN); Peiling Zhang, Shenzhen (CN); Zhuzhan Liu, Shenzhen (CN); Feng Lin, Shenzhen (CN)

(73) Assignee: Xuetao Wang, Guangdong (CN)

( * ) Notice: Subject to any disclaimer, the term of this patent is extended or adjusted under 35 U.S.C. 154(b) by 0 days.

(21) Appl. No.: 17/344,634

(22) Filed: Jun. 10, 2021

(65) Prior Publication Data
US 2022/0210541 A1 Jun. 30, 2022

(30) Foreign Application Priority Data

Dec. 29, 2020 (CN) .......................... 202023252146.5

(51) Int. Cl.
*H04R 1/24* (2006.01)
*H04R 1/10* (2006.01)

(52) U.S. Cl.
CPC ............ *H04R 1/24* (2013.01); *H04R 1/1016* (2013.01); *H04R 1/1025* (2013.01)

(58) Field of Classification Search
CPC ....... H04R 1/24; H04R 1/1016; H04R 1/1025
See application file for complete search history.

(56) References Cited

U.S. PATENT DOCUMENTS

| | | | | |
|---|---|---|---|---|
| 9,210,555 | B2 * | 12/2015 | Larson | H04M 1/6058 |
| 9,467,763 | B2 * | 10/2016 | Beal | H04R 1/1025 |
| 9,543,778 | B1 * | 1/2017 | Corti | H02J 50/10 |
| 11,051,095 | B2 * | 6/2021 | Cramer | A45C 15/00 |
| 2007/0223725 | A1 * | 9/2007 | Neumann | H04R 5/04 381/313 |
| 2009/0213076 | A1 * | 8/2009 | Eichenberger | G06F 3/03543 345/163 |
| 2015/0245127 | A1 * | 8/2015 | Shaffer | H04R 1/1025 381/380 |
| 2017/0277507 | A1 * | 9/2017 | Ando | H04R 27/00 |
| 2018/0091887 | A1 * | 3/2018 | Minoo | H04R 1/1025 |

FOREIGN PATENT DOCUMENTS

| CN | 201957253 U | * | 8/2011 | |
|---|---|---|---|---|
| EP | 2498514 A1 | * | 9/2012 | ......... A61N 1/36032 |
| WO | WO-2020113587 A1 | * | 6/2020 | |

* cited by examiner

*Primary Examiner* — Angelica M McKinney
(74) *Attorney, Agent, or Firm* — Peter J. Ims; Westman, Champlin & Koehler, P.A.

(57) ABSTRACT

The present application provides a wireless headphone assembly, which includes: a wireless headphone including a left earphone and a right earphone; an adaptor including a plug and a wireless communication module that are electrically connected to each other; the plug is configured for plugging into an interface of the an electronic device, such that the electronic device is in wireless communication with the wireless headphone through the wireless communication module; and a rechargeable earphone box including a box body and a box cover; the box body is provided therein wherein a left earphone receiving groove and a right earphone receiving groove, and the rechargeable earphone box is further provided with an adaptor receiving groove. The wireless headphone assembly provided by the present application can receive the adaptor, such that the adaptor is not easy to lose, and it is convenient for users to use.

19 Claims, 4 Drawing Sheets

WIRELESS HEADPHONE ASSEMBLY

CROSS REFERENCE TO RELATED APPLICATION

The present application claims the benefit of Chinese Application with Application No. 202023252146.5, filed on Dec. 29, 2020; the entire content of which is incorporated herein by reference.

TECHNICAL FIELD

The present application relates to the technical field of wireless headphones, and more particularly to a wireless headphone assembly.

BACKGROUND

Mobile phones and computers have become essential electronic products for most people. When the user is watching videos or playing games through mobile phones or computers, many users will use earphones to receive audio to get a better auditory experience. With the advancement of technology, the earphone has gradually developed a wireless and true wireless product form from the previous wired, which greatly facilitates the use of users.

At present, wireless headphones usually use Bluetooth mode to connect with electronic products such as mobile phones and computers. The disadvantage of Bluetooth connection mode is that the sound delay is large, and when the user is watching videos or playing games, the audio and picture may not be synchronized, which is similar to the use of a wireless mouse, a wireless headphone can also establish a wireless connection with a mobile phone or computer through an adaptor, the mobile phone or computer transmits audio signals to the wireless headphone through the adaptor to achieve wireless audio transmission. Compared with the Bluetooth connection mode, the audio signal is sent to the earphone wirelessly through the adaptor, the sound delay is lower, and the effect can be comparable to the wired earphone.

The size of the adaptor is relatively small, and the user places it at will after used, and may not be able to quickly find the adaptor or even lose the adaptor when it is to be used again, which causes inconvenience to the user.

SUMMARY

The present application provides a wireless headphone assembly, the adaptor can be received therein, such that the adaptor is not easily lost and is convenient for users to carry and use.

The present application provides a wireless headphone assembly, which includes:

a wireless headphone including a left earphone and a right earphone;

an adaptor including a plug and a wireless communication module that are electrically connected to each other; the plug is configured for plugging into an interface of the an electronic device, such that the electronic device is in wireless communication with the wireless headphone through the wireless communication module; and a rechargeable earphone box including a box body and a box cover; the box body is provided therein wherein a left earphone receiving groove and a right earphone receiving groove, and the rechargeable earphone box is further provided with an adaptor receiving groove.

The wireless headphone assembly provided according to the present application includes a wireless headphone, an adaptor and rechargeable earphone box. The plug of the adaptor is plugged into the interface of the electronic device, the electronic device supplies power to the adaptor, and the electronic device is wirelessly connected to the wireless headphone through the wireless communication module of the adaptor, so that the audio signal of the electronic device is sent to the wireless headphone, and the user can listen to the audio through the wireless headphone. The rechargeable earphone box is provided with a left earphone receiving groove and a right earphone receiving groove for storing and charging the wireless headphone. In addition, the rechargeable earphone box is also provided with an adaptor receiving groove for receiving the adaptor. The rechargeable earphone box provided by the present application receives the earphones and the adaptor at the same time, so that the adaptor is not easy to lose, and it is convenient for users to carry and use.

In a possible design, the adaptor receiving groove is disposed inside the box body.

Due that the adaptor receiving groove is disposed inside the box body, when the box cover is closed, the adaptor is received inside the box body, and is not easy to lose, and the protection to the adaptor is realized.

In a possible design, the adaptor receiving groove is disposed an outer sidewall of the rechargeable earphone box.

When the adaptor receiving groove is disposed an outer sidewall of the rechargeable earphone box, the user does not need to open the box cover during taking out and putting back the adaptor, the operating is sample and convenient.

In a possible design, the rechargeable earphone box further includes a sliding cover configured for opening or closing the adaptor receiving groove.

When the user needs to use the adaptor, the sliding cover is opened to take out the adaptor; when the adaptor is not in use, the adaptor is fixed in the adaptor receiving groove by the sliding cover, and will not fall off from the rechargeable earphone box and is not easy to lose.

In a possible design, the left earphone is in wireless communication with the right earphone, and the adaptor is in communication with one of the left earphone and the right earphone.

In a possible design, the adaptor is respectively in communication with the left earphone and the right earphone.

Specifically, the adaptor establishes a wireless communication between the electronic device and the wireless headphone through the 2.4 GHz frequency band, the 5 GHz frequency band, or the 5.8 GHz frequency band.

The wireless communication between the electronic device and the wireless headphone is established through the adaptor. Compared with the Bluetooth connection mode, the delay is lower, when the user is watching videos or playing games, there will be no out of synchronization between audio and video, which brings better auditory experience to the users. The direct communication connection established between the adaptor and the wireless headphone may be established with one of the earphones, or may be established with two earphones respectively.

In a possible design, the left earphone receiving groove and the right earphone receiving groove are provided therein with charging contactors.

Due to the small size of wireless headphones, the power storage capacity is poor and the battery life is short, the rechargeable earphone box can not only store the wireless headphones, but also charge the wireless headphones. When the wireless headphones are placed in the receiving grooves of the rechargeable earphone box, the rechargeable earphone box will automatically charge the wireless headphones. The earphone box with charging function not only facilitates the user to carry the wireless headphone, but also extends the battery life of the wireless headphone.

In a possible design, the plug is a type-A USB plug, a type-B USB plug, a type-C USB plug, a micro USB plug or a lightning plug.

Adaptors of different plug types can be electrically connected to different electronic devices. For example, use type-C plugs and micro-USB plugs for electrical connection with Android-powered mobile phones or tablets, lightning plugs for electrical connection with iOS-powered iPhones or tablets, and type-A plugs for electrical connection with computers. The users can choose adaptors of different plug types according to their needs.

In a possible design, the adaptor is received in the adaptor receiving groove in a straight plugging or flat placing manner.

According to the size and the distribution of internal space of different rechargeable earphone boxes, different forms of adaptor receiving grooves are provided accordingly, so that the adaptor can be placed in the adaptor receiving groove in a vertical or flat plugging manner, without causing waste of space in the rechargeable earphone box.

Figure 1:
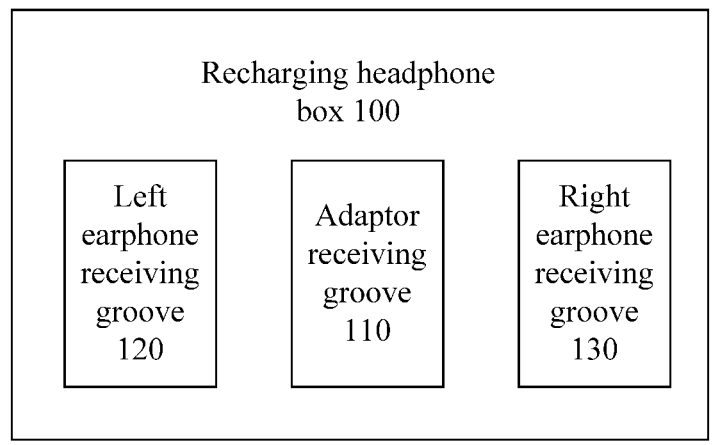
FIG. 1 is a schematic diagram of functional modules of a rechargeable earphone box provided by an embodiment of the present application.

In the drawings, the numerals are listed as follow:

100—rechargeable earphone box; 110—adaptor receiving groove; 111—avoiding groove; 120—let earphone receiving groove; 130—right earphone receiving groove; 131—charging contactor; 140—box cover; 150—box body; 160—battery; 170—screw; 180—PCBA; 190—magnet;

200—adaptor; 210—plug; 220—wireless communication module;

300—wireless headphone; 310—let earphone; 320—right earphone;

400—electronic device.

DETAILED DESCRIPTION

The embodiments of the present application are described in detail below. Examples of the embodiments are shown in the accompanying drawings, in which the same or similar reference numerals indicate the same or similar elements or elements with the same or similar functions. The following embodiments described with reference to the drawings are exemplary, and are only used to explain the present application, and cannot be understood as a limitation to the present application.

In the description of the present application, it should be noted that, unless otherwise clearly specified and limited, the terms "mounting" and "connection" should be understood in a broad sense, for example, it can be a fixed connection, a detachable connection, or an integral connection; it can be a mechanical connection, it can be an electrical connection, or it can communicate with each other; it can be a direct connection or an indirect connection through an intermediary, and it can be a communication between two components or an interaction relationship between two components. For those of ordinary skill in the art, the specific meanings of the above-mentioned terms in the present application can be understood according to specific circumstances.

In the description of the present application, it should be understood that the terms "upper", "lower", "side", "front", "rear", etc. indicate the orientation or positional relationship based on the orientation or positional relationship of the mounting, which is only in order to facilitate the description of the present application and simplify the description, it does not indicate or imply that the device or element referred to must have a specific orientation, be configured and operated in a specific orientation, and therefore cannot be understood as a limitation of the present application.

It should also be noted that in the embodiments of the present application, the same reference numeral is used to denote the same component or the same part. For the same part in the embodiment of the present application, only one of the parts or components may be labeled as an example in the figure. With reference signs, it should be understood that the reference signs are also applicable to other identical parts or components.

Headphones can generally be divided into wired headphones and wireless headphones. The wired headphone has two earphones and a connecting cable. The connecting cable connects to the electronic device and connects the left earphone and the right earphone. The wireless headphone can use wireless communication technology (such as Bluetooth technology, infrared radio frequency technology, 2.4G wireless technology, ultrasonic, etc.) to communicate with electronic devices. Compared with wired headphone, the wireless headphone is more convenient to use because it gets rid of the shackles of physical wires, thus get rapid development.

Some wireless headphones still connect the left earphone and the right earphone through a cable. With the development of technology, a true wireless headphone, also called true wireless stereo (TWS) headphone, has emerged. TWS headphones completely abandon the wire connection method, including independent left earphone and right earphone (main earphone and secondary earphone). The left and right earphones of the TWS earphone can form a stereo system through wireless connection, and the auditory experience of the user has been greatly improved.

In addition, either of the two earphones can also work independently. For example, in the case that the main earphone is not connected to the secondary earphone, the main earphone can return to mono sound quality. Due to the fact that the left and right earphones of TWS headphones have no physical connection, almost all TWS headphones are equipped with a rechargeable headphone box with both charging and storage functions. The rechargeable headphone box can provide power and storage functions for the wireless headphone. When the earphones are not in use, just put the earphones in the box, and the charging box will charge the earphones.

The wireless headphone assemblies provided in the embodiments of the present application take TWS headphone and TWS headphones boxes as examples.

The embodiment of the present application provides a wireless headphone assembly, including: the wireless headphone 300, the adaptor 200, and the rechargeable headphone box 100. The rechargeable headphone box 100 is provided with the adaptor receiving groove 110 configured for receiving the adaptor 200, so that the adaptor 200 is placed together with the wireless headphone 300 in the rechargeable headphone box 100, which is convenient for users to carry and use.

Among them, the wireless headphone 300 includes the left earphone 310 and the right earphone 320. The adaptor 200 includes the plug 210 and the wireless communication module 220. The plug 210 is electrically connected to the wireless communication module 220. The plug 210 is plugged into the interface of the electronic device 400 to make the electronic device 400 in wireless communication with the wireless headphone 300 through the wireless communication module 220.

The rechargeable headphone box 100 includes a box body 150 and a box cover 140. The box body 150 is provided with the left earphone receiving groove 120 and the right earphone receiving groove 130 for storing the left earphone 310 and the right earphone 320 in the box body 150. The rechargeable headphone box 100 is further provided an adaptor receiving groove 110 for storing the adaptor 200.

It should be understood that the box body 150 and the box cover 140 of the rechargeable headphone box 100 may be a separate structure or an integrated structure. When the rechargeable headphone box 100 is the separate structure, the box cover 140 can be completely separated from the box body 150; when it is the integrated structure, one side of the box cover 140 is hinged with the box body 150, which is convenient for the user to control the opening and closing of the box cover 140.

As shown in FIG. 1. The FIG. 1 is a modular schematic diagram of the rechargeable headphone box 100, which includes the adaptor receiving groove 110, the left earphone receiving groove 120, and the right earphone receiving groove 130.

Herein, the electronic device 400 can be any of mobile phones, tablets, computers, TVs, and game consoles. As long as the electronic device 400 has a data transmission interface that can output audio, it can establish a wireless communication with the headphone through the adaptor 200 to send the audio signal to the headphone. When connecting to the computers, the TVs, and the game consoles, the plug 210 of the adaptor 200 is plugged into a data transmission interface of type-A USB interface, and when connecting to the mobile phone, and the plug 210 is plugged into the charging interface of the mobile phone. Further, the electronic device 400 supplies power to the adaptor 200 through the data transmission interface.

The wireless headphone assembly provided according to the present application includes a wireless headphone 300, an adaptor 200 and rechargeable earphone box 100. The plug 210 of the adaptor 200 is plugged into the interface of the electronic device 400, the electronic device 400 supplies power to the adaptor 200, and the electronic device 400 is wirelessly connected to the wireless headphone 300 through the wireless communication module 220 of the adaptor 200, so that the audio signal of the electronic device 400 is sent to the wireless headphone 300, and the user can listen to the audio through the wireless headphone 300. The rechargeable earphone box 100 is provided with the left earphone receiving groove 120 and the right earphone receiving groove 130 for storing and charging the wireless headphone 300. In addition, the rechargeable earphone box 100 is also provided with the adaptor receiving groove 110 for receiving the adaptor 200. The rechargeable earphone box 100 provided by the present application receives the wireless headphone 300 and the adaptor 200 at the same time, so that the adaptor 200 is not easy to lose, and it is convenient for users to carry and use.

Optionally, the adaptor receiving groove 110 is provided in the box body 150 of the rechargeable headphone box 100.

Figure 2:
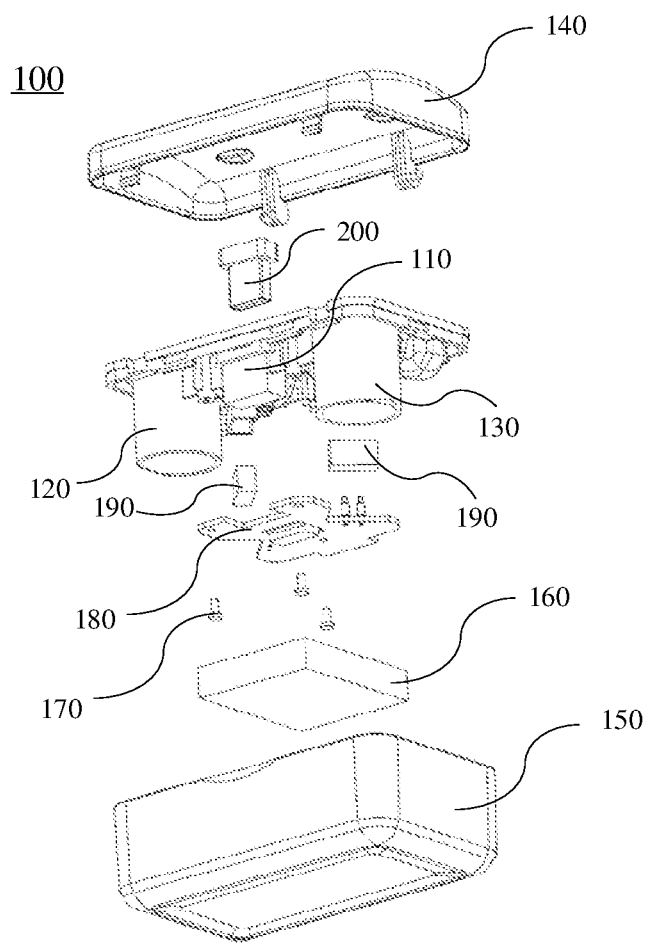
FIG. 2 is an exploded view of a rechargeable earphone box provided by an embodiment of the present application.
Figure 3:
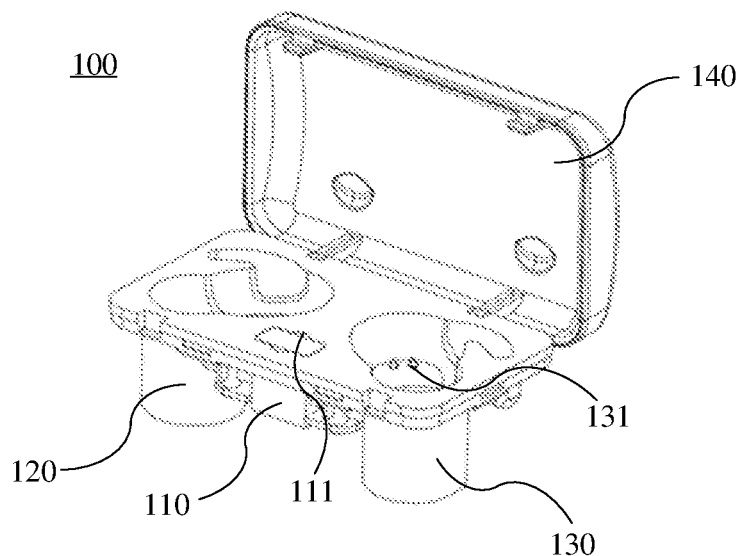
FIG. 3 is a schematic structural view of a rechargeable earphone box provided by an embodiment of the present application.

Specifically, as shown in FIGS. 2 and 3, the left earphone receiving groove 120, the right earphone receiving groove 130, and the adaptor receiving groove 110 are formed by recessing the top surface of the box body 150 inward.

The adaptor receiving groove 110 is arranged in the box body 150. When the box cover 140 is closed on the box body 150, the adaptor 200 is received inside the box body 150, which is not easy to lose and protects the adaptor 200.

Optionally, the adaptor receiving groove 110 is disposed on the outer sidewall of the rechargeable headphone box 100.

Optionally, when the adaptor receiving groove 110 is disposed on the outer sidewall of the rechargeable headphone box 100, the rechargeable headphone box 100 further includes a sliding cover for closing or opening the adaptor receiving groove.

Herein, the adaptor receiving groove 110 is disposed on the outer sidewall of the rechargeable headphone box 100, either on the outer sidewall at the bottom of the box body 150, on the outer sidewall around the box body 150, or on the outer sidewall of the box cover 140, the present application does not limit the position of the adaptor receiving groove 110 on the rechargeable headphone box 100.

When the adaptor receiving groove 110 is disposed on the outer sidewall of the rechargeable headphone box 100, the user does not need to open the box cover 140 when taking out and putting back the adaptor 200, and the operation is simpler and more convenient.

When the adaptor receiving groove 110 is set on the outer sidewall of the rechargeable headphone box 100, the rechargeable headphone box 100 also includes the sliding cover, which is used to close or open the adaptor receiving groove 110. When the adaptor 200 is needed to use, the sliding cover is opening, and then taking out the adaptor 200; when the adaptor 200 is not in use, the adaptor 200 is fixed in the adaptor receiving groove 110 by the sliding cover, so it will not fall off from the rechargeable headphone box 100 and is not easy to lose.

During the audio transmission process, the adaptor 200 is in wireless communication to the wireless headphone 300 and electrically connected to the electronic device 400 through the plug 210, thereby establishing a wireless communication between the electronic device 400 and the wireless headphone 300.

Specifically, the wireless communication module 220 of the adaptor 200 is in wireless communication with the wireless headphone 300 through the 2.4 GHz frequency band, the 5 GHz frequency band, or the 5.8 GHz frequency band.

2.4 GHz, 5 GHz and 5.8 GHz frequency bands are all public ISM frequency bands open worldwide. In these frequency bands, the short-distance wireless transmission can be carried out, and information such as audio signals can be transmitted.

Figure 4:
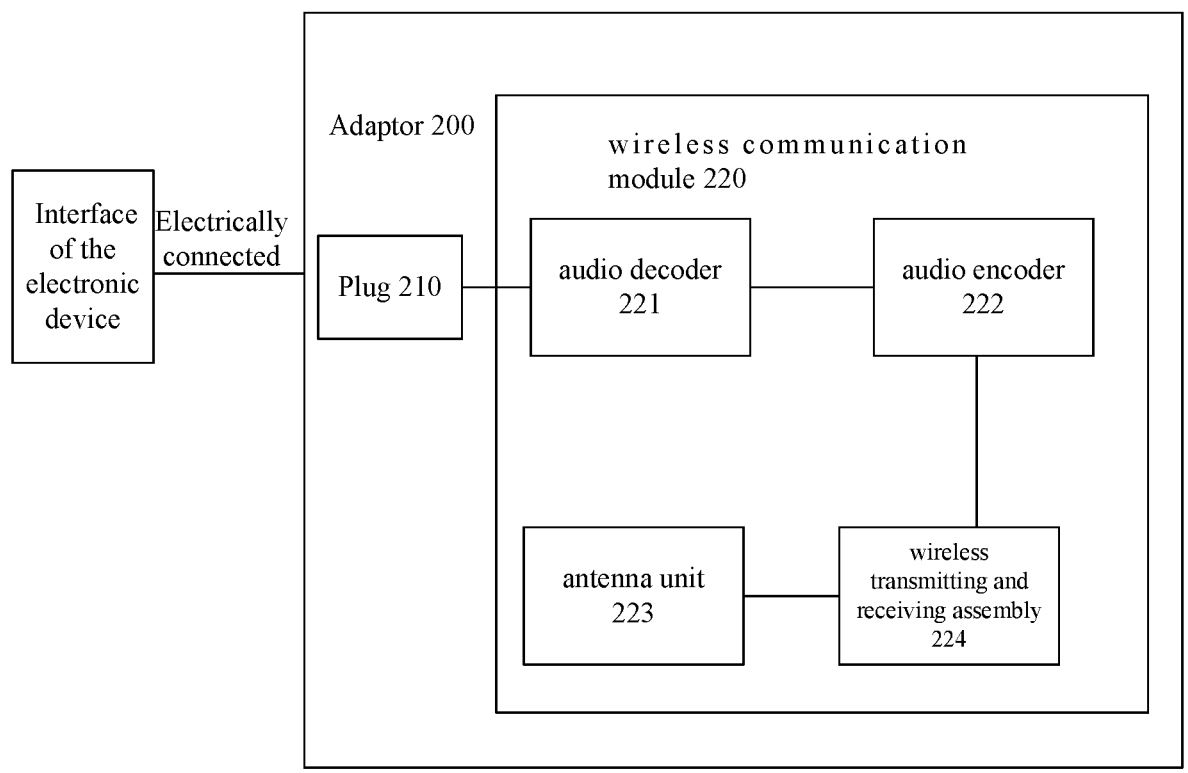
FIG. 4 is a schematic diagram of functional modules of an adaptor provided by an embodiment of the present application.

As shown in FIG. 4, the wireless communication module 220 further includes an audio decoder 221, an audio encoder 222, a wireless transmitting and receiving assembly 224, and an antenna unit 223. The plug 210 of the adaptor 200 is plugged into the interface of the electronic device 400 and is electrically connected to the electronic device 400. The audio decoder 221 obtains the audio information played by the electronic device 400 at this time and decodes it, and then transfers the decoded audio information to the audio decoder 221, and the audio information is encoded into SBC format, ACC format, APTX format or LC3 format through the audio encoder 222, and then the encoded format is transmitted to the wireless transmitting and receiving assembly 224 to transmit the encoded audio signal through the antenna unit 223.

Correspondingly, the wireless headphone 300 is provided with a corresponding audio signal processing module, including an antenna unit 223 for receiving audio signals, an audio decoder 221 for processing audio signals, the audio signal processing module is connected to a sounding module of the wireless headphone 300, and after the audio decoder 221 performs decoding to the audio signal, and playing through the sounding module, then the user can hear the audio of the music or video played by the electronic device 400.

Specifically, the wireless transmitting and receiving assembly 224 may be a 2.4 GHz, 5 GHz or 5.8 GHz wireless transmitting and receiving assembly 224, and the antenna unit 223 may be a PCB antenna, a ceramic antenna or a laser-direct-structuring (LDS) antenna.

The wireless communication between the electronic device 400 and the wireless headphone 300 is established through the adaptor 200. Compared with the Bluetooth connection mode, the delay is lower. When the user is watching videos or playing games, there will be no out of synchronization between audio and video, which brings a better auditory experience to the user.

Figure 5:
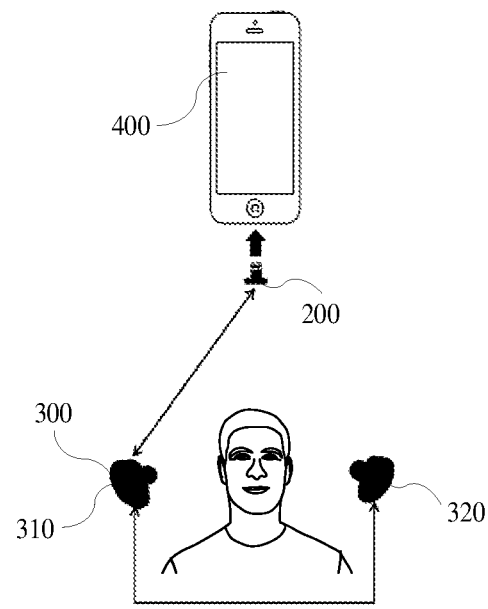
FIG. 5 is a wireless communication manner provided by an embodiment of the present application.

Exemplarily, as shown in FIG. 5, the left earphone 310 is in communication connection with the right earphone 320, and the adaptor 200 is in wireless communication with one of the left earphone 310 and the right earphone 320. For example, the adaptor 200 is in wireless communication with the right earphone 320, that is, the adaptor 200 is directly connected to the right earphone 320 and indirectly connected to the left earphone 310, the right earphone 320 is used as the main earphone, and the left earphone 310 is used as the secondary earphone. When sending audio, the adaptor 200 first transmits the audio signal of the electronic device 400 to the right earphone 320 as the main earphone, and then forwards it to the left earphone 310 by the right earphone 320 to realize the simultaneous sound of the two earphones.

Figure 6:
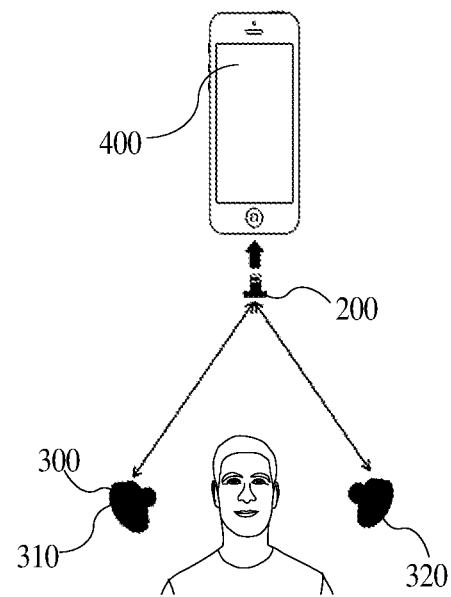
FIG. 6 is another wireless communication manner provided by an embodiment of the present application.

Exemplarily, as shown in FIG. 6, the adaptor 200 is in wireless communication with the left earphone 310 and the right earphone 320 respectively. At this time, the adaptor 200 is directly connected to both the left earphone 310 and the right earphone 320. The left earphone 310 and the right earphone 320 are both the main earphones, and both can communicate directly with adaptor 200. When sending audio, the adaptor 200 transmits the audio signal of the electronic device 400 to the left earphone 310 and the right earphone 320 at the same time.

Compared with the main-secondary earphone mode, the dual-main earphone has lower latency, and the left earphone 310 and right earphone 320 power consumption are average. There will be no greater power consumption of the main earphone in the main-secondary earphone mode, and the user experience will be better.

The rechargeable headphone box 100 provided by the embodiment of the present application has a charging function, and the left earphone 310 and the right earphone 320 are charged through the left earphone receiving groove 120 and the right earphone receiving groove 130, respectively.

Specifically, as shown in FIG. 3, charging contactors 131 are provided in the left earphone receiving groove 120 and the right earphone receiving groove 130. When the left earphone 310 and the right earphone 320 are respectively placed in the receiving grooves, the charging contactors 131 provided in the receiving grooves are electrically connected to the charging contactors provided on the left earphone 310 and the right earphone 320 to start charging.

Optionally, as shown in FIG. 2, a magnet 190 is further provided at the lower part of the left earphone receiving groove 120 and the right earphone receiving groove 130 in the box body 150 of the rechargeable headphone box 100, the magnet 190 is configured to magnetically adsorb the wireless headphone 300, which is convenient for the user to put the wireless headphone 300 into the left earphone receiving groove 120 and the right earphone receiving groove 130.

Figure 7:
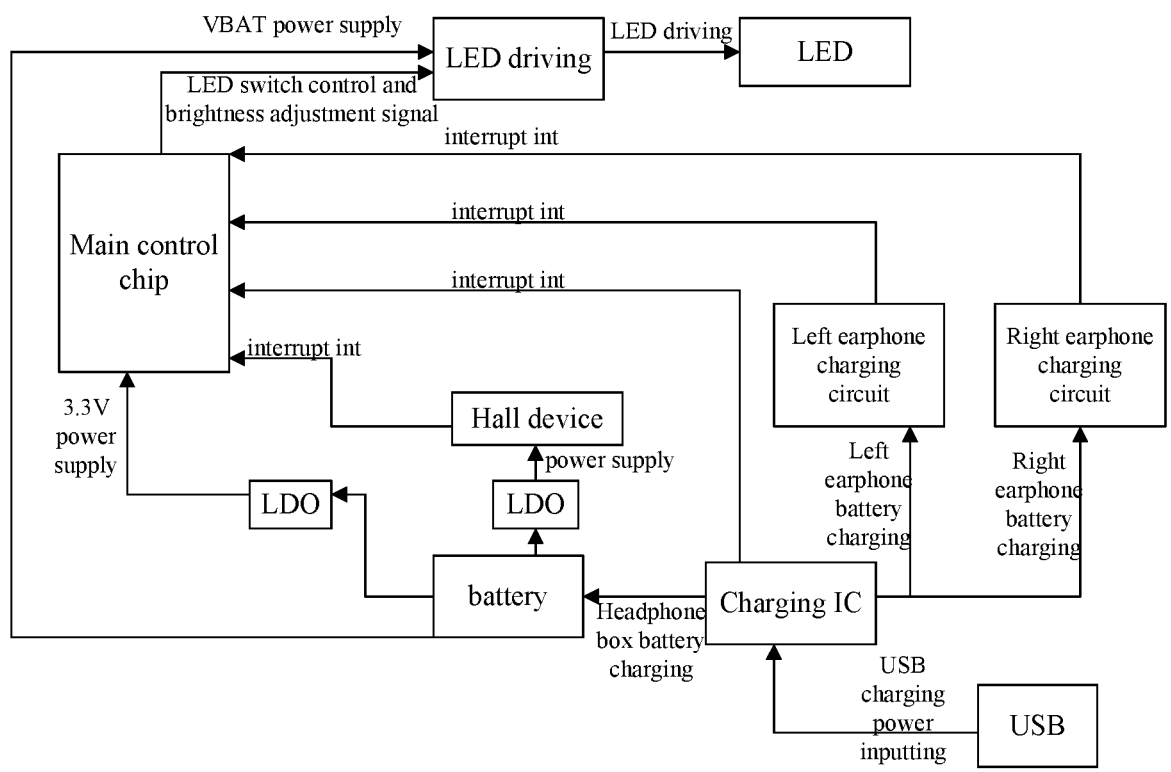
FIG. 7 is a schematic diagram of a charging circuit of a rechargeable earphone box provided by an embodiment of the present application.

FIG. 7 is a schematic diagram of the charging circuit of the rechargeable headphone box 100. The charging circuit is integrated on the Printed Circuit Board Assembly (PCBA) 180. Among them, the main control chip is used to control the LED light on the rechargeable headphone box 100 to display the current charging status and power of the rechargeable headphone box 100. For example, after the charging interface is connected to the power supply, the LED light is on, indicating that it is in the charging state at this time, and when the LED light is in red color, which means that the rechargeable headphone box 100 is not fully charged, when the LED light is in green color, which means that it is fully charged. The Hall device is used to detect whether the box cover 140 of the rechargeable headphone box 100 is in an open state or a closed state. When in the closed state, the charging circuit charges the earphone box; when in the open state, charging stops. When the charging interface is connected to the power source, the charging circuit simultaneously charges the battery 160 and the wireless headphone 300 in the rechargeable headphone box 100; and when the charging interface is disconnected, the charging circuit charges the wireless headphone 300 through the battery 160.

Due to the small size of the wireless headphone 300, the power storage capacity is poor and the battery life is short, the rechargeable headphone box 100 can not only receive the wireless headphone 300, but also charge the wireless headphone 300. When the wireless headphone 300 is placed in the receiving grooves of the rechargeable headphone box 100, the rechargeable headphone box 100 will automatically charge the wireless headphone 300. The headphone box with charging function not only facilitates the user to carry the wireless headphone 300, but also extends the battery life of the wireless headphone 300.

Optionally, the plug 210 type of the adaptor 200 can be a type-A USB plug, a type-B USB plug, a type-C USB plug, a micro USB plug, or a lightning plug.

It should be understood that the plug 210 of the adaptor 200 may also be other types of plugs, including a new type of USB plug that may appear in the future, which is not limited in the present application.

Adaptor 200 of different plug types can be electrically connected to different electronic device 400. For example, the type-C plugs and the micro-USB plugs are used for electrical connection with Android-powered mobile phones or tablets, the lightning plugs are used for electrical connection with iOS-powered iPhones or tablets, and type-A plugs are used for electrical connection with computers. The users can choose adaptor 200 with different plug types according to their needs. The adaptor 200 of different plug types can be placed in the adaptor receiving groove of the rechargeable headphone box 100.

In addition, the manner in which the adaptor 200 is placed in the adaptor receiving groove 110 is not limited, and it may be placed in a straight plugging manner or in a flat plugging manner.

According to different sizes and internal space distributions of the rechargeable headphone box 100, different forms of adaptor receiving groove 110 are provided therein, so that adaptor 200 can be placed in adaptor receiving groove 110 vertically or horizontally without causing waste of space within the rechargeable headphone box 100.

Optionally, opposite ends of the adaptor receiving groove 110 are further provided with avoiding grooves 111.

The avoiding groove 111 may be designed in an arc shape and located at the left and right ends of the adaptor receiving groove 110 or the front and rear ends thereof to facilitate the operation of the user when taking out and putting back the adaptor 200.

The above-mentioned embodiments do not constitute a limitation on the protection scope of the technical solution. Any modification, equivalent replacement and improvement made within the spirit and principle of the above implementation manners should be included in the protection scope of the technical solution.

What is claimed is:

1. A wireless headphone assembly, comprising:
   a wireless headphone, comprising a left earphone and a right earphone;
   an adaptor, comprising a plug and a wireless communication module that are electrically connected to each other; wherein the plug is configured for plugging into an interface of an electronic device, such that the electronic device is in wireless communication with the wireless headphone through the wireless communication module;
   a rechargeable earphone box, comprising a box body and a box cover; wherein the box body is provided therein wherein a left earphone receiving groove and a right earphone receiving groove, and the rechargeable earphone box is further provided with an adaptor receiving groove; and
   wherein the adaptor is configured to be taken out from the adaptor receiving groove during use, the plug is configured to be plugged into the interface of the electronic device, and the electronic device is in communication with the left earphone and/or the right earphone through the wireless communication module.

2. The wireless headphone assembly of claim 1, wherein the adaptor receiving groove is disposed inside the box body.

3. The wireless headphone assembly of claim 2, wherein the left earphone receiving groove and the right earphone receiving groove are provided therein with charging contactors.

4. The wireless headphone assembly of claim 2, wherein the adaptor establishes a wireless communication between the electronic device and the wireless headphone through a 2.4 GHz frequency band, a 5 GHz frequency band or a 5.8 GHz frequency band.

5. The wireless headphone assembly of claim 2, wherein the adaptor is received in the adaptor receiving groove in a straight plugging or flat placing manner.

6. The wireless headphone assembly of claim 1, wherein the adaptor receiving groove is disposed an outer sidewall of the rechargeable earphone box.

7. The wireless headphone assembly of claim 6, wherein the rechargeable earphone box further comprises a sliding cover configured for opening or closing the adaptor receiving groove.

8. The wireless headphone assembly of claim 7, wherein the left earphone receiving groove and the right earphone receiving groove are provided therein with charging contactors.

9. The wireless headphone assembly of claim 7, wherein the adaptor establishes a wireless communication between the electronic device and the wireless headphone through a 2.4 GHz frequency band, a 5 GHz frequency band or a 5.8 GHz frequency band.

10. The wireless headphone assembly of claim 7, wherein the adaptor is received in the adaptor receiving groove in a straight plugging or flat placing manner.

11. The wireless headphone assembly of claim 6, wherein the left earphone receiving groove and the right earphone receiving groove are provided therein with charging contactors.

12. The wireless headphone assembly of claim 6, wherein the adaptor establishes a wireless communication between the electronic device and the wireless headphone through a 2.4 GHz frequency band, a 5 GHz frequency band or a 5.8 GHz frequency band.

13. The wireless headphone assembly of claim 6, wherein the adaptor is received in the adaptor receiving groove in a straight plugging or flat placing manner.

14. The wireless headphone assembly of claim 1, wherein the left earphone is in wireless communication with the right earphone, and the adaptor is in communication with one of the left earphone and the right earphone, respectively.

15. The wireless headphone assembly of claim 1, wherein the adaptor is respectively in communication with the left earphone and the right earphone.

16. The wireless headphone assembly of claim 1, wherein the left earphone receiving groove and the right earphone receiving groove are provided therein with charging contactors.

17. The wireless headphone assembly of claim 1, wherein the plug is a type-A USB plug, a type-B USB plug, a type-C USB plug, a micro USB plug or a lightning plug.

18. The wireless headphone assembly of claim 1, wherein the adaptor establishes a wireless communication between the electronic device and the wireless headphone through a 2.4 GHz frequency band, a 5 GHz frequency band or a 5.8 GHz frequency band.

19. The wireless headphone assembly of claim 1, wherein the adaptor is received in the adaptor receiving groove in a straight plugging or flat placing manner.

* * * * *